US008154832B2

(12) United States Patent
Huang

(10) Patent No.: US 8,154,832 B2
(45) Date of Patent: Apr. 10, 2012

(54) LEAK DETECTION AND LEAK PROTECTION CIRCUIT

(76) Inventor: Huadao Huang, Yueqing (CN)

( * ) Notice: Subject to any disclaimer, the term of this patent is extended or adjusted under 35 U.S.C. 154(b) by 0 days.

(21) Appl. No.: 12/774,565

(22) Filed: May 5, 2010

(65) Prior Publication Data

US 2011/0273813 A1 Nov. 10, 2011

(51) Int. Cl.
*H02H 3/16* (2006.01)
*H02H 9/08* (2006.01)
*H01H 73/00* (2006.01)

(52) U.S. Cl. ............... 361/42; 361/45; 361/49; 361/115

(58) Field of Classification Search .................... 361/42, 361/45, 49, 115
See application file for complete search history.

(56) References Cited

U.S. PATENT DOCUMENTS 5,241,443 A * 8/1993 Efantis ............................ 361/36
5,600,524 A * 2/1997 Neiger et al. ................... 361/42
5,999,093 A * 12/1999 Hanisko ........................ 340/454
6,084,759 A * 7/2000 Hansson et al. .............. 361/111
7,136,266 B2 * 11/2006 Gershen et al. ................. 361/42
7,239,491 B1 * 7/2007 Morgan et al. .................. 361/42
7,423,854 B2 * 9/2008 Gandolfi et al. ................ 361/42
2006/0007610 A1 * 1/2006 Chan et al. ...................... 361/42

FOREIGN PATENT DOCUMENTS

CN 10046263 * 10/2008

* cited by examiner

*Primary Examiner* — Rexford N Barnie
*Assistant Examiner* — Zeev V Kitov
(74) *Attorney, Agent, or Firm* — Mei & Mark LLP

(57) ABSTRACT

A leak detecting and leak protecting circuit comprises a rectification circuit comprising positive and negative power output ends, current limiting resistors, a diode, a silicon control comprising control poles, a switch capable of linking to a resetting button, and a tripping coil comprising a built-in iron core. The rectification circuit outputs DC power. The tripping coil, switch, and silicon control are connected in series and then are connected to the positive and negative power output ends of the DC power output from the rectification circuit. The control poles of the silicon control are capable of connection with a shielding layer of output wires through at least one of the current limiting resistors and a diode. And, when the switch is in a resetting state, the switch is closed, and, when the switch is in a tripped state, the switch is open.

12 Claims, 4 Drawing Sheets

LEAK DETECTION AND LEAK PROTECTION CIRCUIT

TECHNICAL FIELD

The present disclosure relates generally to leak detection and leak protection electrical circuits for power sockets and power plugs.

BACKGROUND

Along with the continuous development of the industry of power sockets and plugs that have leakage protective functions, higher and higher requirements are proposed for the safe utilization of power sockets and power supplies with leakage protective functions. People hope that it should be possible to examine regularly if the leakage protective plug/socket has a leakage protective function while the plug/socket is in service. In this way, when its life terminates, i.e. the internal elements are rendered ineffective and the leakage protective function is lost, the user can be reminded in time to replace it with a new product.

SUMMARY

Concerning the above reasons, Applicant proposes a leakage detection protective circuit which has a compact circuit and stable and reliable performance. The circuit can be examined regularly to determine if a power plug or socket has a leakage protective function and the circuit can display the examination result.

The circuit also provides protection in the event of a lightning strike and provides protection from electrophoresis.

In one embodiment, a leak detecting and leak protecting circuit comprises a rectification circuit comprising positive and negative power output ends, current limiting resistors, a diode, a silicon control comprising control poles, a switch capable of linking to a resetting button, and a tripping coil comprising a built-in iron core. The rectification circuit outputs DC power. The tripping coil, switch, and silicon control are connected in series and then are connected to the positive and negative power output ends of the DC power output from the rectification circuit. The control poles of the silicon control are capable of connection with a shielding layer of output wires through at least one of the current limiting resistors and a diode. And, when the switch is in a resetting state, the switch is closed, and, when the switch is in a tripped state, the switch is open.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

A leakage detection protective circuit has a compact circuit and stable and reliable performance. The circuit can be examined regularly to determine if a power plug or socket has a leakage protective function and the circuit can display the examination result.

The leakage detection protective circuit may also include a failure indicator for indicating the leakage failure and a power output indicator for indicating whether the leakage detection protective circuit has power output. In the case that leakage failure exists in the power supply circuit of the power plug/socket, the failure indicator is on. In the case that leakage failure occurs when the resetting button is in the resetting state, the resetting button trips, and the failure indicator is on.

A timing chip may output a control signal at a certain interval to trigger a break over of a silicon control to examine regularly whether the power socket/plug still has a leakage protective function.

Figure 1A:
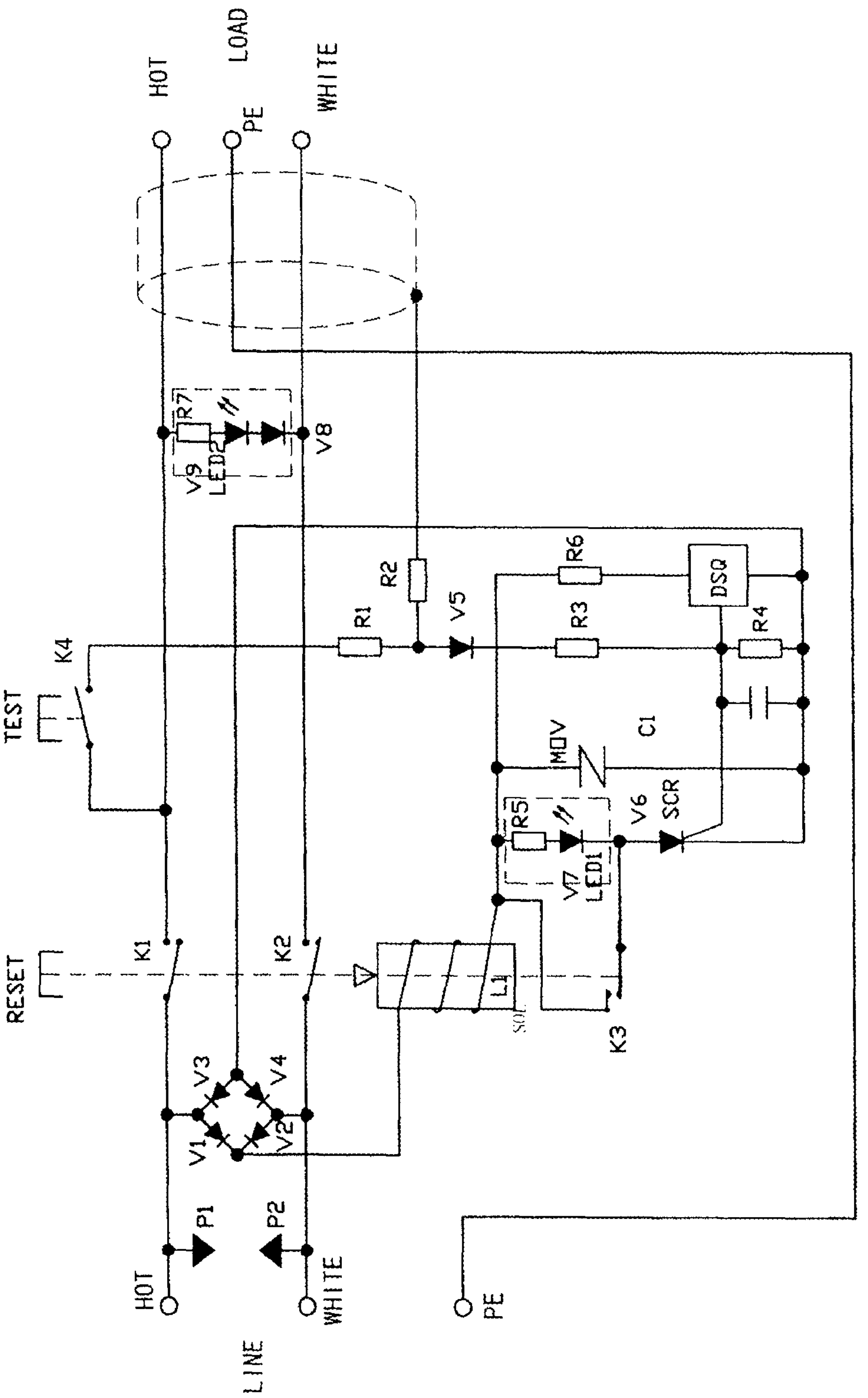
FIG. 1A is a first example of a circuit diagram for a leakage detection protective circuit.

FIG. 1A is a circuit diagram of a possible implementation of Example 1, where the leakage detection protective circuit is applied in a power socket/plug to give it a leakage protective function. As shown in FIG. 1A, this leakage detection protective circuit is composed of a rectification circuit with rectifier diodes V1-V4, current-limiting resistors R1-R6, diode V5, silicon control V6, trip switch K3 linked with resetting button RESET and tripping coil L1 (SOL) with a built-in iron core. The silicon control V6 may be, for example, a silicon-controlled rectifier (SCR).

The action of the iron core built in the tripping coil L1 can make the resetting button RESET reset or trip. The tripping coil L1 with built-in iron core, trip switch K3 linked with resetting button RESET and silicon control V6 are connected in series, and then are connected to the positive and negative power output ends of the DC power supply output from the rectification circuit V1-V4.

The control poles of the silicon control V6 are connected with the shielding layer of the power socket/plug power output wires through the current-limiting resistor R3, diode V5 and current-limiting resistor R2 respectively. The power output live line HOT, zero line WHITE and safety grounding line PE of the power socket/plug are wrapped in the shielding layer, which is composed of alloy wires (copper, iron, etc.), by braiding. When leakage exists in the power socket/plug, and because the current of the working load is often relatively high, the plastic protective sleeve wrapping on the exterior of the power live line, zero line or safety grounding line starts to soften and even melts. This causes the insulation layer to break and to contact with the shielding layer and subsequently causes the shielding layer to be electrified. When the shielding layer is electrified, it is possible to judge the existence of a leakage failure in the power socket/plug quickly and accurately.

When the resetting button RESET is in a tripped state, the trip switch K3 linked with the resetting button RESET is open. When the resetting button RESET is pressed down and when the resetting button RESET is in a resetting state, the trip switch K3 linked with resetting button RESET is closed.

When the resetting button RESET is reset, the transfer switches K1 and K2, and trip switch K3 linked with resetting button RESET are closed. The working load side LOAD of the power socket/plug has power output. If a leakage phenomenon (leakage failure) exists in the power supply circuit, the shielding layer will be electrified, the control pole of the silicon control V6 will be at a high level, the silicon control V6 will be broken over, current will flow through the tripping coil L1, and a magnetic field will be generated in the tripping coil L1. The built-in iron core will act to make the resetting button RESET trip and to disconnect the transfer switches K1 and K2 linked with the resetting button RESET in the main power supply circuit in the power socket/plug, thereby allowing no power output from the power socket/plug.

To indicate the state of the power socket, in this utility model, a failure indicator light emitting diode LED1 for indicating whether leakage failure exists is connected in parallel to the two ends of the trip switch K3 linked with the resetting button RESET.

When the live line HOT and zero line WHITE of the power input side LINE of the power socket/plug are connected properly with the power live line and zero line in the wall, and as the resetting button RESET is in a tripped state, the trip switch K3 linked with the resetting button RESET is open. In this case, if a leakage phenomenon exists in the power supply circuit of the power socket/plug, the shielding layer of the power output wire will be electrified, the control pole of the silicon control V6 will be at a high level, the silicon control V6 will be triggered and broken over, and the failure indicator LED1 will be on to show existence of a leakage failure. If the failure indicator LED1 is not on, it means no leakage failure exists in the power supply circuit of the power socket/plug.

When the resetting button RESET is pressed down and when the resetting button RESET is in a resetting state, the trip switch K3 is closed. If a leakage failure exists in the power supply circuit of the power socket/plug, the silicon control V6 will be triggered and broken over immediately, thereby disconnecting the transfer switches K1 and K2 and trip switch K3 linked with the resetting button RESET in the main power supply circuit of the power socket/plug and allowing no power output from the power socket/plug. Now the failure indicator LED1 turns on again. Therefore, when the failure indicator LED 1 is on, it means that a leakage failure exists in the power supply circuit of the power socket/plug.

A power output indicator light emitting diode LED2 is connected in parallel between the live line HOT and zero line WHITE in the load side LOAD of the leakage detection protective circuit. When the load side has power output, LED2 is on. When the load side has no power output, LED2 is off.

To examine manually whether the power socket/plug has a leakage detection protective function, i.e. whether the life of the socket is terminated, as shown in FIG. 1, the control poles of the silicon control V6 are also connected with the power live line through the current-limiting resistors R3 & R1, diode V5 and test switch K4 below the manual test button TEST. Pressing the test button TEST manually makes the test switch K4 close and generates a simulated leakage current, subsequently making the control poles of the silicon control V6 be connected with the power live line through the current-limiting resistors R3 & R1 and to achieve high level. If the power socket/plug with a leakage protective function still has the leakage protective function, i.e. the life is not terminated, the silicon control V6 will be broken over, current will flow through the tripping coil L1 to generate a magnetic field, the built-in iron core will act to make the resetting button RESET trip and to disconnect the transfer switches K1 and K2 in the main power supply circuit of the power socket/plug. The power socket/plug will have no power output. On the contrary, if the life of the power socket/plug is terminated, the resetting button RESET can not be tripped or reset.

In order to regularly examine whether the power socket/plug still has leakage protective function, as shown in FIG. 1A, a timing chip DSQ (Model 225\226\227) is added in the leakage detection protective circuit. The control signal output end of this timing chip DSQ can be connected with the control pole of the silicon control V6. Timing chip DSQ outputs a control signal at a certain interval (or is set manually) to break over the silicon control V6. This causes current to flow through the tripping coil L1 to generate a magnetic field, making the built-in iron core act to trip the resetting button RESET. The transfer switches K1 & K2 linked with the resetting button RESET in the main power supply circuit of the power socket/plug are disconnected, allowing no power output from the power socket, in order to examine whether the power socket still has a leakage protective function.

As shown in FIG. 1A, the rectification circuit is a bridge rectification circuit composed of rectifier diodes V1-V4. The rectification circuit AC power input end is connected to the power live line HOT and zero line WHITE in the input side LINE of the power socket/plug.

To improve the service life of the leakage protective socket/plug and to avoid damage to the power socket/plug resulting from the instantaneous high voltage caused by lightning or other reasons, as shown in FIG. 1A, right triangle or isosceles triangle discharging metal sheets P1 & P2 are used for discharging. Discharging metal sheets P1 and P2 are connected respectively at the power input end live line HOT and zero line WHITE. The discharging metal sheets P1 & P2 are placed with the tips facing to each other and with a certain spacing kept. A piezoresistor MOV is connected in parallel between the anode and cathode of the silicon control V6. The piezoresistor MOV may be, for example, a metal oxide varistor.

When an instantaneous high voltage caused by lightning or other reasons is applied to the power socket/plug, the air medium between the tip of discharging metal sheet P1 and the tip of discharging metal sheet P2 is broken down, forming an air discharge. Most of the high voltage is consumed through the discharging metal sheets P1 and P2. The rest of the high voltage, which is a small part, is consumed through the tripping coil SOL and piezoresistor MOV, thereby protecting the power socket/plug from being damaged by the high voltage.

In the implementation of example 1, a surge-inhibiting type piezoresistor is used for the said piezoresistor MOV so that it has the function of preventing electrophoresis.

Figure 1B:
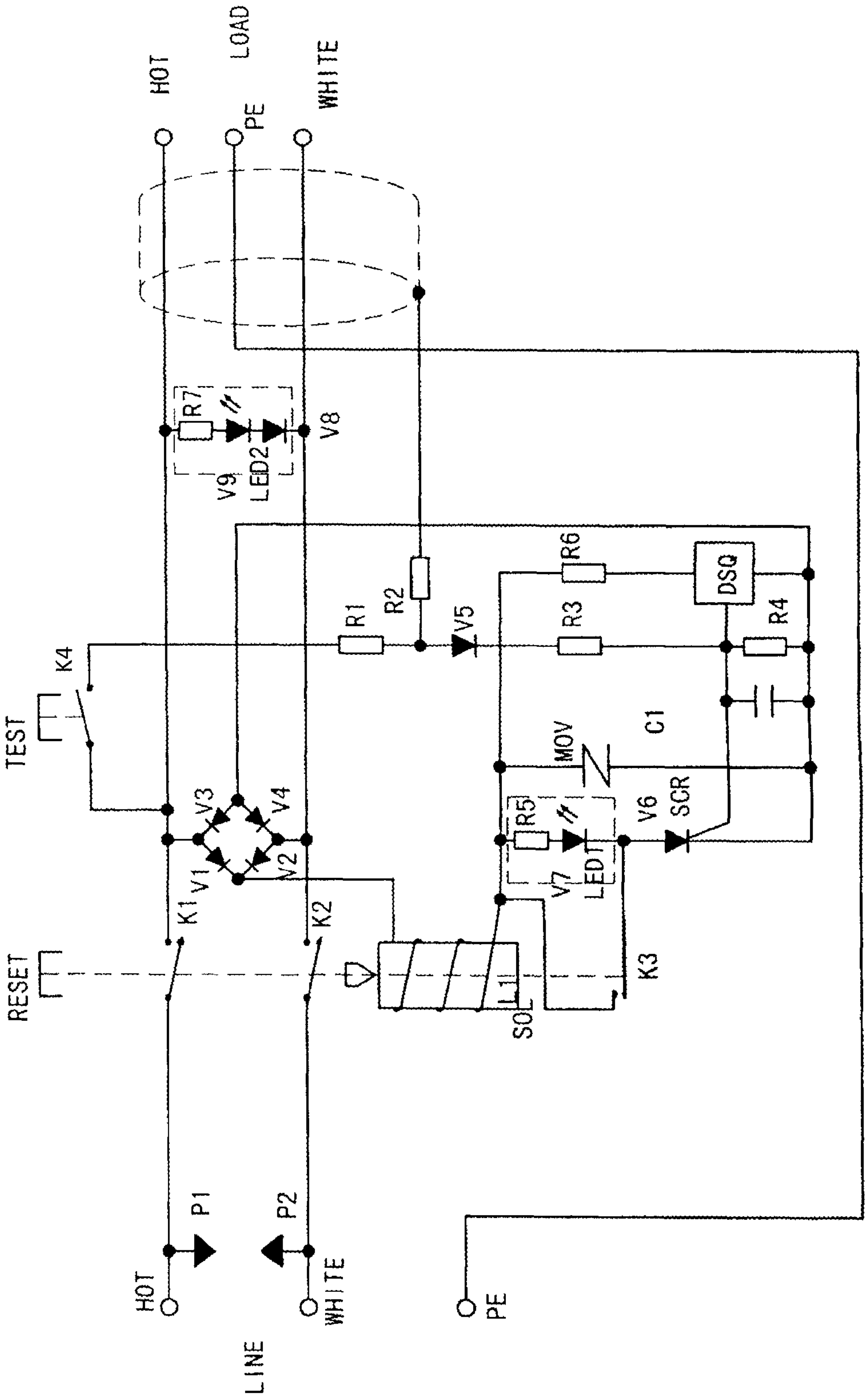
FIG. 1B is a second example of a circuit diagram for a leakage detection protective circuit.

FIG. 1B is a circuit diagram of a possible implementation of Example 2 of the leakage detection protective circuit, and its difference from the implementation of Example 1 shown in FIG. 1A is as follows. The AC power input end of the DC power supply is connected to the live line HOT and zero line WHITE in the load side LOAD of the power socket/plug. When the power input end of the power socket/plug is connected properly with the power wires in the wall, the leakage detection protective circuit shown in Example 1 is electrified automatically and can work, while the leakage detection protective circuit shown in Example 2 can only be electrified and work after the switches K1 & K2 in the main power supply circuit are closed.

Figure 2A:
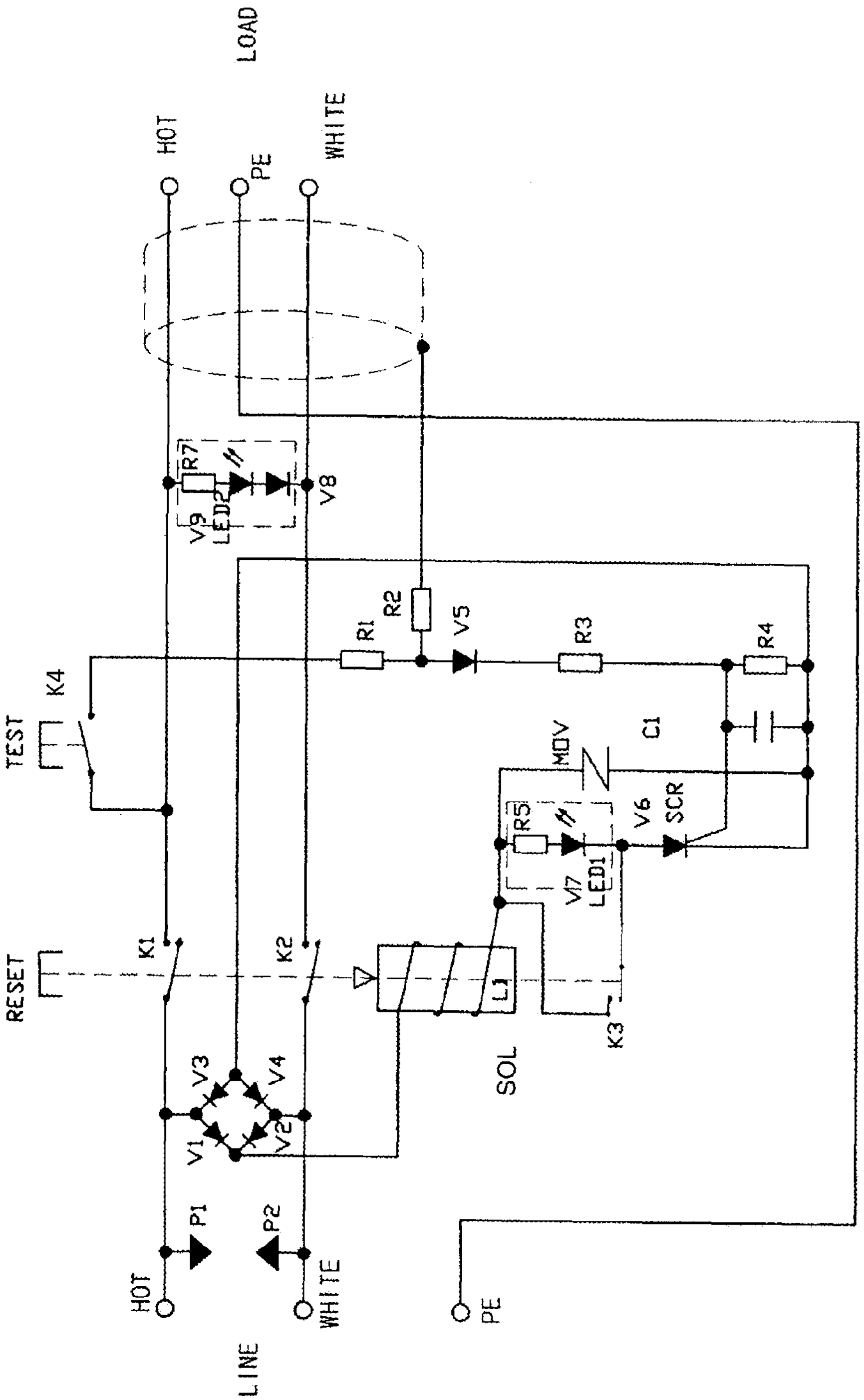
FIG. 2A is a third example of a circuit diagram for a leakage detection protective circuit.

FIG. 2A is a circuit diagram of a possible implementation of Example 3 of the leakage detection protective circuit. It differs from the implementation of Example 1 as follows: The timing chip DSQ connected with the control pole of the silicon control V6 is omitted.

Figure 2B:
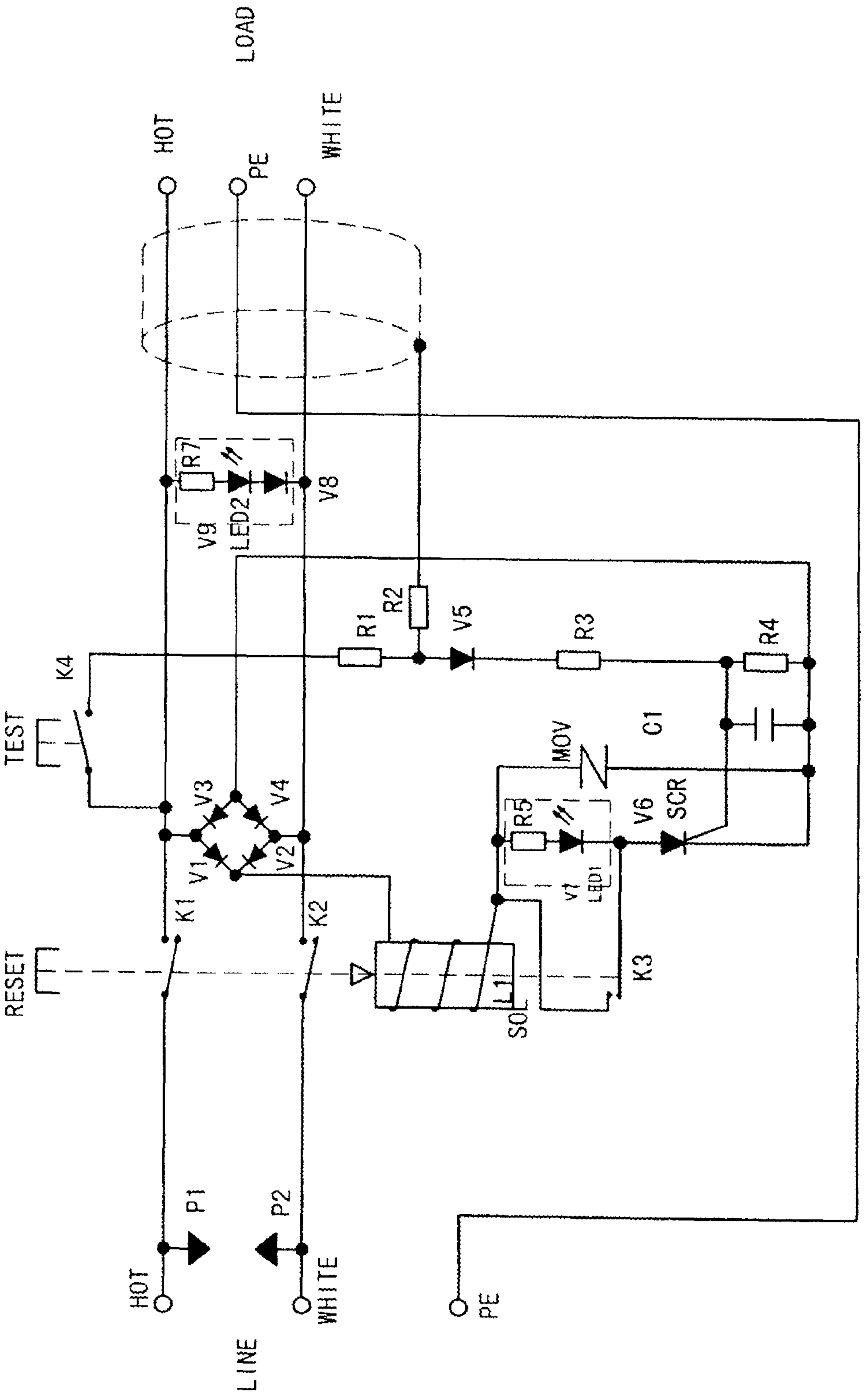
FIG. 2B is a fourth example of a circuit diagram for a leakage detection protective circuit.

FIG. 2B is a circuit diagram of a possible implementation Example 4 of the leakage detection protective circuit. It differs from the implementation of Example 3 as follows: The AC power input end of the DC power supply is connected to the live line HOT and zero line WHITE in the load side LOAD of the power socket.

The leakage protective circuit model has the following prominent advantages:

(1) A user can judge whether the power socket/plug has a leakage failure by testing whether the shielding layer of the power output wire of the power socket/plug is electrified. The circuit is simple and compact, and the performance is stable and reliable.

(2) A user can regularly examine whether the power socket/plug still has a leakage detection protective function, i.e. whether the life is terminated.

(3) The circuit has the function of preventing the power socket/plug from damage resulting from the instantaneous high voltage caused by lightning or other reasons.

(4) The circuit can be manually examined with the results displayed.

The contents described above covers specific implementations of examples and the technical principles adopted. Any equivalent conversion based on the technical scheme of this utility model is included in the scope of protection of this utility model. Various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A leak detecting and leak protecting circuit, comprising:
- a rectification circuit comprising positive and negative power output ends;
- current limiting resistors;
- a diode;
- a light emitting diode;
- a silicon controlled rectifier comprising control poles;
- a switch capable of linking to a resetting button; and
- a tripping coil comprising a built-in iron core,
- wherein the rectification circuit outputs DC power,
- wherein the tripping coil, switch, and silicon controlled rectifier are directly connected in series and are electrically connected to the positive and negative power output ends of the DC power output from the rectification circuit,
- wherein the light emitting diode is connected in parallel to ends of the switch and between the tripping coil and the silicon controlled rectifier,
- wherein a control pole of the silicon controlled rectifier is capable of connection with a shielding layer of output wires through at least one of the current limiting resistors and the diode, and
- wherein, when the switch is in a resetting state, the switch is closed, and, when the switch is in a tripped state, the switch is open.

2. The circuit of claim 1, further comprising a resetting button, wherein, when the resetting button is pressed down it places the switch in the resetting state, and, when the resetting button is in a tripped state, the switch is open.

3. The circuit of claim 1, further comprising:
- a power output indicator light emitting diode for indicating power output through the circuit;
- a live line load connection on a load side of the circuit; and
- a zero line load connection on the load side of the circuit,
- wherein the light emitting diode is a failure indicating light emitting diode,
- wherein, when an electrical leak is detected by the circuit the failure indicating light emitting diode is emitting light,
- wherein, when an electrical leak is detected by the circuit and the switch is in a resetting state, the switch is open, and the failure indicating light emitting diode is emitting light, and
- wherein the power output indicating light emitting diode is connected in parallel to the live line load connection and the zero line load connection.

4. The circuit of claim 3, further comprising a timing chip comprising a control signal output end, wherein the control signal output end is connected with a control pole of the silicon controlled rectifier, wherein the timing chip outputs a control signal at a predetermined interval to break over the silicon controlled rectifier, and wherein the control signal is of sufficient power to test whether the circuit provides a leak protection function.

5. The circuit of claim 1, further comprising a timing chip comprising a control signal output end, wherein the control signal output end is connected with a control pole of the silicon controlled rectifier, wherein the timing chip outputs a control signal at a predetermined interval to break over the silicon controlled rectifier, and wherein the control signal is of sufficient power to test whether the circuit provides a leak protection function.

6. The circuit of claim 4, further comprising:
- a test switch capable of coupling to a manual test button; and
- a live line power input connection on a line side of the circuit,
- wherein a control pole of the silicon controlled rectifier is connected to the live line power input connection through a current-limiting resistor and the test switch to form a simulated leak circuit.

7. The circuit of claim 6, further comprising a manual test button coupled to the test switch, wherein, when the test button is pressed down, the test switch is in a closed state.

8. The circuit of claim 6, further comprising:
- a zero line power input connection on a line side of the circuit,
- wherein the rectification circuit is a bridge rectification circuit comprising four rectification diodes and an AC power input end, and
- wherein the AC power input end is connected across the live line power input connection and the zero line power input connection.

9. The circuit of claim 8, wherein the bridge rectification circuit comprises an AC power input end, and wherein the AC power input end is connected across the live line load connection and the zero line load connection.

10. The circuit of claim 9, further comprising:
- a first triangular discharging metal sheet on the live line power input connection; and
- a second triangular discharging metal sheet on the zero line power input connection, wherein the first triangular discharging metal sheet and the second triangular discharging metal sheet are capable of discharging electricity, wherein first triangular discharging metal sheet and the second triangular discharging metal sheet are spaced apart with tips of the respective triangles facing one another, and wherein the first triangular discharging metal sheet is one of a right triangle or an isosceles triangle and the second triangular discharging metal sheet is one of a right triangle or an isosceles triangle.

11. The circuit of claim 8, further comprising:

a first triangular discharging metal sheet on the live line power input connection; and a second triangular discharging metal sheet on the zero line power input connection, wherein the first triangular discharging metal sheet and the second triangular discharging metal sheet are capable of discharging electricity, wherein the first triangular discharging metal sheet and the second triangular discharging metal sheet are spaced apart with tips of the respective triangles facing one another, and wherein the first triangular discharging metal sheet is one of a right triangle or an isosceles triangle and the second triangular discharging metal sheet is one of a right triangle or an isosceles triangle.

12. The circuit of claim 10, further comprising a MOV piezoresistor, wherein the silicon controlled rectifier comprises an anode and a cathode, and wherein the MOV piezoresistor is connected in parallel between the anode and the cathode of the silicon control.

* * * * *